United States Patent
Taylor et al.

(10) Patent No.: US 11,573,822 B2
(45) Date of Patent: Feb. 7, 2023

(54) SYSTEM AND METHOD FOR GENERATING AND USING A CONTEXT BLOCK BASED ON SYSTEM PARAMETERS

(71) Applicant: ARTERIS, INC., Campbell, CA (US)

(72) Inventors: Eric Taylor, Austin, TX (US); Jason Villanueva, Austin, TX (US)

(73) Assignee: ARTERIS, INC., Campbell, CA (US)

( * ) Notice: Subject to any disclaimer, the term of this patent is extended or adjusted under 35 U.S.C. 154(b) by 219 days.

(21) Appl. No.: 17/137,365

(22) Filed: Dec. 30, 2020

(65) Prior Publication Data

US 2022/0206837 A1 Jun. 30, 2022

(51) Int. Cl.
*G06F 9/00* (2006.01)
*G06F 30/327* (2020.01)
*G06F 30/31* (2020.01)
*G06F 9/46* (2006.01)
*G06F 9/30* (2018.01)

(52) U.S. Cl.
CPC .......... *G06F 9/461* (2013.01); *G06F 9/30101* (2013.01); *G06F 9/30123* (2013.01); *G06F 30/327* (2020.01); *G06F 30/31* (2020.01)

(58) Field of Classification Search
CPC ........ G06F 30/327; G06F 30/31; G06F 9/461; G06F 9/30101; G06F 9/30123
USPC ............... 716/101, 102, 103, 104; 703/14
See application file for complete search history.

(56) References Cited

U.S. PATENT DOCUMENTS

| | | | | |
|---|---|---|---|---|
| 10,990,724 | B1 * | 4/2021 | Cherif | G06F 30/392 |
| 11,210,445 | B1 * | 12/2021 | Coddington | G06F 30/327 |
| 11,307,883 | B2 * | 4/2022 | Dolbeau | G06F 9/45525 |
| 2014/0376569 | A1 * | 12/2014 | Philip | G06F 1/12 370/503 |
| 2019/0163508 | A1 * | 5/2019 | Dolbeau | G06F 8/4441 |
| 2021/0357156 | A1 * | 11/2021 | Beale | G06F 9/462 |
| 2021/0357223 | A1 * | 11/2021 | Beale | G06F 9/355 |
| 2021/0357240 | A1 * | 11/2021 | Beale | G06F 9/45558 |
| 2022/0180034 | A1 * | 6/2022 | Coddington | G06F 30/327 |
| 2022/0188490 | A1 * | 6/2022 | Cherif | G06F 30/394 |
| 2022/0207226 | A1 * | 6/2022 | Angiolini | G06F 30/33 |
| 2022/0222404 | A1 * | 7/2022 | Angiolini | G06F 30/398 |

* cited by examiner

*Primary Examiner* — Phallaka Kik
(74) *Attorney, Agent, or Firm* — Dana Legal Services; Jubin Dana

(57) ABSTRACT

A system and method for generating a context block using system parameters. The system parameters include objective parameters, functionality parameters, and interface definitions. Context field definitions are received. The system parameters and context fields definitions may be used to determine context fields and context entries. The system parameters may be used to determine context fields and number of context entries. The context module hardware description may be created using context fields, number of context entries, and context field definitions.

19 Claims, 8 Drawing Sheets

SYSTEM AND METHOD FOR GENERATING AND USING A CONTEXT BLOCK BASED ON SYSTEM PARAMETERS

FIELD OF THE INVENTION

The present technology is in the field of computer system design and, more specifically, related to a context generation scheme in synthesis of the topology of a network-on-chip (NoC).

BACKGROUND

When electronics communicate over a network, a networking device may include a context module that allows the networking device to store and retrieve information about the network communication. The context block may reduce the amount of data that is sent over the network. For example, in a typical request/response cycle over a network, a context module may store information about the request such that when the response is returned, less information is transmitted about the request. For example, the context module may create an ID for the request and use this ID to retrieve information when a response is returned. Network communication may occur between components in an integrated circuit (IC) using a network-on-chip (NoC), between IC chips, between circuit boards, between electronic devices, and any combination of the preceding.

Multiprocessor systems implemented in systems-on-chips (SoCs) communicate through networks, such as a network-on-chip (NoC). Intellectual Property (IP) blocks or elements or cores are used in chip design. The SoCs include instances of intellectual property (IP) blocks. Some IP blocks are masters. Some IP blocks are slaves. Masters and slaves communicate through a network, such as a NoC.

When an electronic designer creates a context module, the designer is required to specify low-level implementation details, e.g., width for various bit fields, field set/clear conditions, field driver, width of signals, context entries, context fields, naming of the desired bit fields to store in the context, properties, etc. Having to specify the low-level implementation details creates a challenge when optimizing the system level performance, e.g., circuit area, power used by circuit, timing, performance, bandwidth, etc. Furthermore, as ICs grow exponentially in complexity so does the number of low-level implementation details which further increases the difficulty in optimizing the system level performance. Therefore, what is needed is a system and a method, which given system parameters (e.g., functionality and performance goals), for creating a context module that is at least partially based on the system parameters.

SUMMARY

The invention discloses a system and a method, which given system parameters (e.g., functionality and performance goals), for creating a context module that is at least partially based on the system parameters. Benefits of the system and the method may include allowing the user to optimize the system performance without having to understand the low-level implementation details, optimally configuring a context block with minimal input from the user, easing the design burden placed on the user by reducing the number of parameters the user has to adjust, simplified user interface with fewer options, reducing duplicate fields, reducing fields that are not needed, reducing circuitry area, and reducing circuitry power.

According to one or more embodiments and aspects of the invention, the system parameters may be used to create a hardware description of a context block. The hardware description may be hierarchical, e.g., contain sub-blocks. According to one or more embodiments and aspects of the invention, the hardware creation may include optimization. For another example, the hardware description may be register transfer level (RTL). According to one or more embodiments and aspects of the invention, system parameters may include objective parameters (e.g., circuitry area, timing, power, performance goals, etc.), functionality parameters (e.g., transaction types such as narrow transactions), interface definitions (e.g., interface of connected components, interface connected to the context block, etc.), and any other parameter that may be used to create a context block. According to an embodiment and aspect of the invention, the system parameters may include a combination of system parameters and low-level implementation details. According to one or more embodiments and aspects of the invention, based on system parameters, it may be determined that no context fields are needed. According to one or more embodiments and aspects of the invention, logic (e.g., combinational logic, non-combination logic, etc.) may be added in the context block.

According to one or more embodiments and aspects of the invention, the system parameters may determine context fields and context entries. The context fields and context entries may be selected from a context field definition library. The context field definition may be a pre-defined library, user defined, or any combination of the proceeding. The context field definition library may include hardware implementation details needed to create a hardware description. For example, the invention may use context fields and context entries along with the context field definition library to create a hardware description. The hardware description may be RTL.

According to one or more embodiments and aspects of the invention, the system parameters may be used to determine context fields and number of context entries. For example, the invention may use context fields and number of context entries along with the context field definition library to create a hardware description. The hardware description may be RTL.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
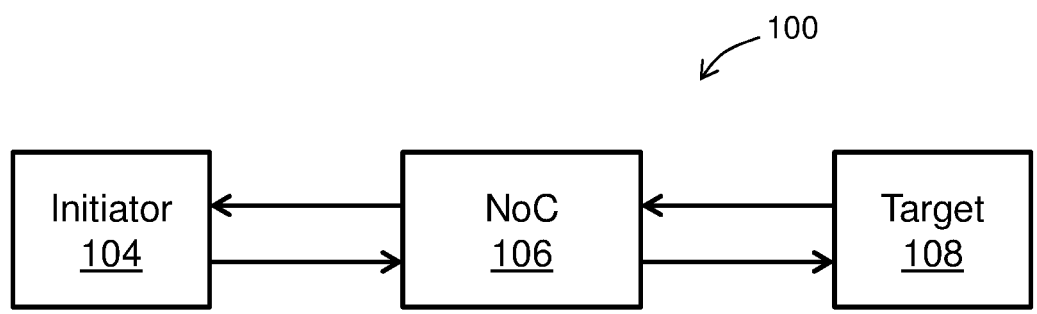
FIG. 1 shows a system having an initiator, a network-on-chip (NoC), and a target, in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

The terms "signal path," "path," and "route" are used interchangeable herein. Paths includes and are made up of any combination of end points and edges (edges are also referred to herein as links), along which a transaction in the form or a signal or data travels form source to destination (sink or target).

As used herein, a "master," an "initiator," and "source" refer to similar intellectual property (IP) blocks, units, or modules. The terms "master" and "initiator" and "source" are used interchangeably within the scope and embodiments of the invention. As used herein, a "slave," a "target," and "sink" refer to similar IP blocks; the terms "slave" and "target" and "sink" are used interchangeably within the scope and embodiments of the invention. As used herein, a transaction may be a request transaction or a response transaction. Examples of request transactions include write request and read request.

In accordance with various aspects and embodiments of the invention, "context" is a collection of identical context entries. The number of entries and what fields each entry will contain is determined by incoming system parameters through a context generation script.

In accordance with various aspects and embodiments of the invention, "context block" is a digital block that has incoming and outgoing interfaces and context. These interfaces will affect and be affected by the state of context.

In accordance with various aspects and embodiments of the invention, "context entry" is a standard group of context fields that needs to be held for a period of time to be used at a future time. Once this information is not needed, then that context entry can become free and available for other uses.

In accordance with various aspects and embodiments of the invention, "context field" is a subset of a context entry. The context filed holds state with a specific purpose. The context filed can be set, modified, or cleared during any time of a context entry's life. Context field can act independently of one another and all are originated from and tied to the same context entry.

In accordance with various aspects and embodiments of the invention, "context field definition" is an object that holds all information associated with a context field. The context field definition is held in the context block's generation script and is used to implement the field in RTL. Example of the context field definition is written as follows:

```
context.field.definition = {
    "field name" : {
        "width" : integer
        "set_condition" : "wire name",
        "clear_condition" : "wire name",
        "drive_signal" : "wire name",
        "has_unique" : true or false,
        ...
    },
    "field name" : {
        "width" : integer
        "set_condition" : "wire name",
        "clear_condition" : "wire name",
        "drive_signal" : "wire name",
        "has_unique" : true or false,
        ...
    },
}
```

Referring now to FIG. 1, a system 100 is shown having an initiator 104 that is connected to the network-on-chip (NoC) 106 with a path that carries signals. The initiator 104 communicates with a target 108 through the NoC 106. The initiator 104 and the target 108 are connected to the NoC 106 with respective paths that carries signals or data packets. The initiator 104 sends requests to the target 108. The target 108 sends responses to the initiator 104. The responses and requests are considered transactions that travel through the NoC 106.

Figure 2:
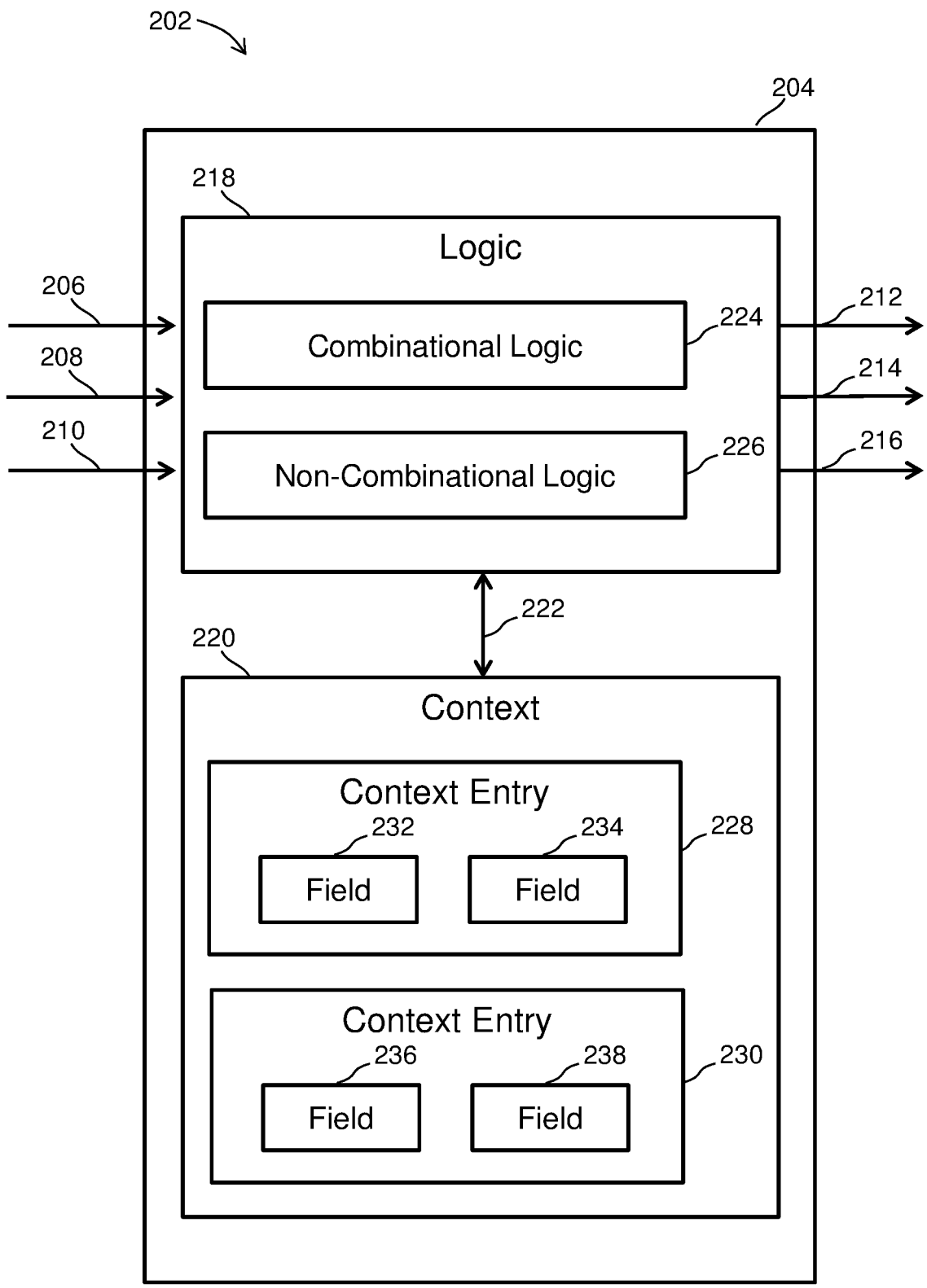
FIG. 2 shows a context block, in accordance with the various aspects and embodiments of the invention.

Referring now to FIG. 2, a system 202 is shown according to one or more embodiments and aspects of the invention. Context block 204 has communication interface paths 206, 208, 210, 212, 214, and 216. Communication interface paths 206, 208, 210, 212, 214, and 216 may be any combination of input, output, and bi-directional paths. In the current example in accordance with some aspects and embodiment of the invention, only one direction is shown for paths 206, 208, 210, 212, 214, and 216 even though other embodiments could be shows with different directions or bi-directional paths. Furthermore, though six communication interface paths (i.e., 206, 208, 210, 212, 214, and 216) are taught in accordance with an aspect and embodiment, any number of communication interface paths may be used and the scope of the invention is not limited thereby. Context block 204 includes logic 218 and context 220. Logic 218 provides logic function for context 220, e.g., by limiting the number of transactions entering context 220. Logic 218 may be any type of logic including combinational logic 224, non-combinational logic 226 (e.g., sequential logic), and any combination of the proceeding. Context 220 may include any number of context entries. Context 220 includes context entries 228 and 230. Each context entry may include any number of context fields. Context entry 228 includes context fields 232 and 234, and context entry 230 includes context fields 236 and 238. According to one or more embodiments and aspects of the invention, each context entry (e.g., context entry 228 and 230) may have the same fields (e.g., each respective field may have the same configuration across the different context entries). In accordance with some aspects and embodiments of the invention, each context entry may contain different fields (e.g., different number of fields between context entries, configuration of each field may be different across context entries, etc.).

Figure 3:
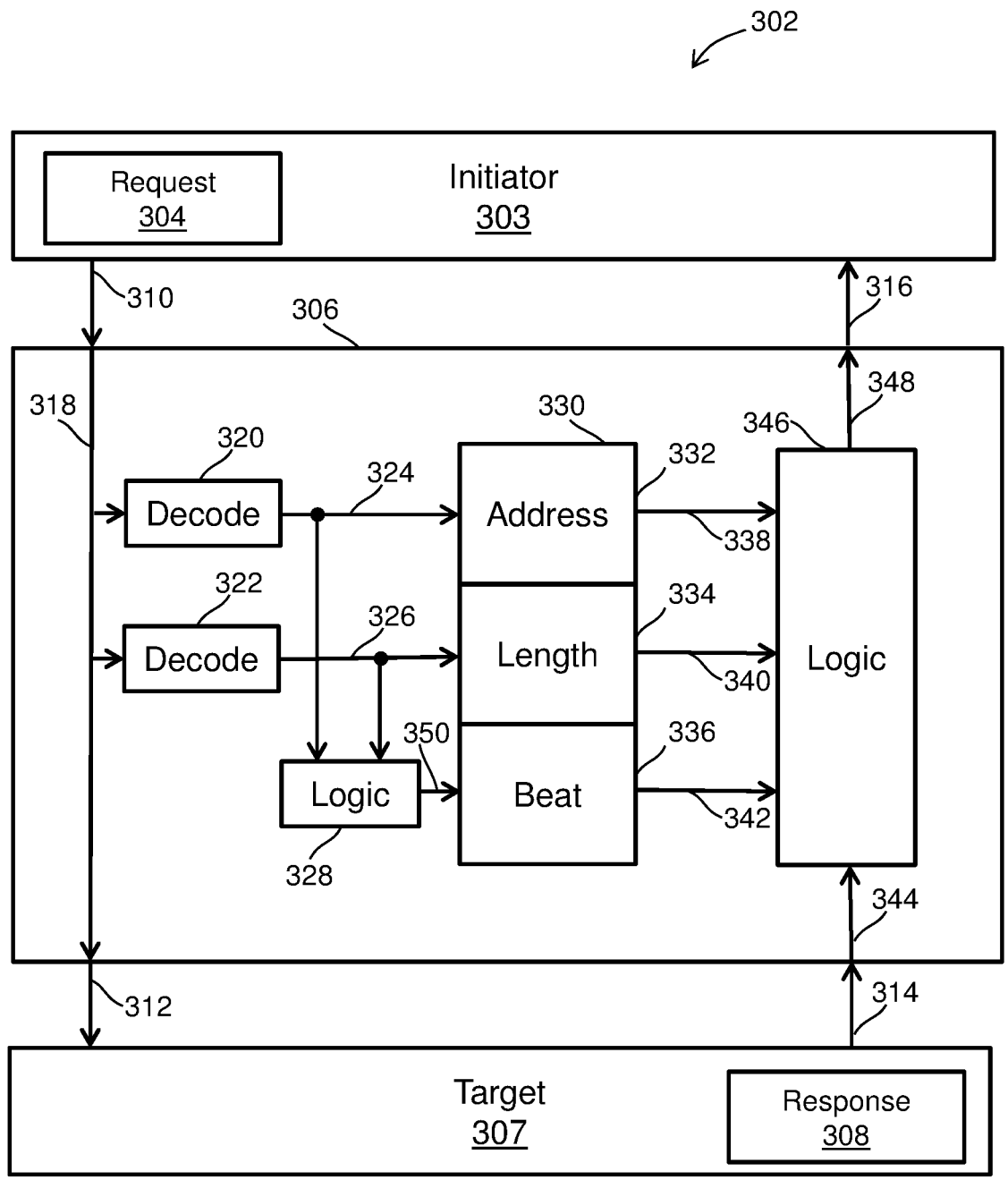
FIG. 3 shows a context block during a request and response cycle, in accordance with the various aspects and embodiments of the invention.

Referring now to FIG. 3, a system 302 is shown and includes an initiator 303 communicating with a target 307 through a context block 306 in accordance with one or more embodiments and aspects of the invention. Request 304 and response 308 are communicated using context block 306. The initiator 303 (sending request 304) begins communication with context block 306 by transmitting request 304 via path 310. Context block 306 routes the request 304 through internal circuitry and sends the request 304 to target 307 via path 318 and path 312. After Target 307 processes the request 304, response 308 is transmitted via path 314 to context block 306. Context block 306 routes the response 308 through internal circuitry and sends the response to initiator 304 via path 316.

Context block 306 internally routes the request 304 via path 318. Path 318 may include any combination of paths and circuitry. When the request 304 is sent over path 318, decode block 320 decodes the address from the request 304 and sends the decoded address over path 324 to address context entry 332. Likewise, decode block 322 decodes the length from the request 304 and sends the decoded length over path 326 to length context entry 334. Logic 328 receives and uses the signals on path 324 and path 326 to derive a beat signal. The beat signal is sent over path 350 to beat context entry 336. Context 330 includes address context entry 332, length context entry 334, and beat context entry 336.

Context block 306 internally routes the response 308 via path 344 to logic 346. Path 344 may include any combination of paths and circuitry. Logic 346 evaluates the response 308, which allows logic 346 to determine that address, length, and beat context fields that need to be retrieved. Logic 346 looks up address signal via path 338, length signal via path 340, and beat signal via path 342 from context 330. Logic 346 modifies the response 308 sent via path 344 with address signal 332 via path 338, a length signal 334 via path 340, and a beat signal 336 via path 342. For example, logic 346 may use address signal 332 via path 338, a length signal 334 via path 340, and a beat signal 336 via path 342 to drive the response. Logic 346 then sends the modified response to initiator 303 via path 348 and path 316. Path 348 may include any combination of paths and circuitry.

Figure 4:
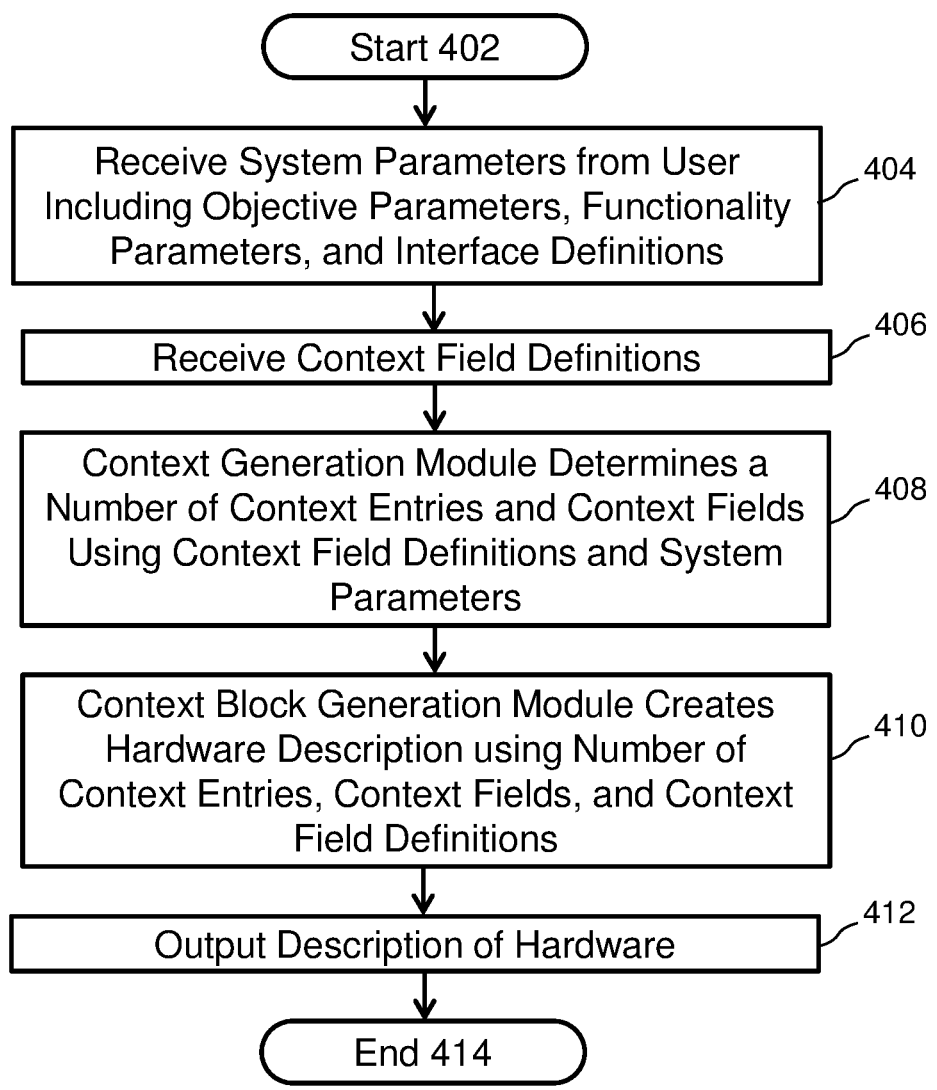
FIG. 4 shows a context block creation process using parameters to create a hardware description, in accordance with the various aspects and embodiments of the invention.

Referring now to FIG. 4, a context block creation process is started with step 402. In accordance with some embodiments and aspects of the invention, a context block creation process described in FIG. 4 uses system parameters to create a hardware description. In accordance with some embodiments and aspects of the invention, the context creation process may be started by user input, by a scheduled time occurring, another task completing, a milestone event occurring in an electronic design, any other event capable of starting a system parameter to context block creation process, and any combination of the aforementioned.

At step 404, system parameters are received from the user, which include objective parameters, functionality parameters, and interface definitions. The objective parameters may include circuitry area, timing, power used by circuit, bandwidth, any other performance goal, and any combination of the proceeding. For example, the system parameters may specify to optimize bandwidth for a given power consumption. For another example, the system parameters may specify to minimize the circuitry area. The functionality parameters may include the type of transactions that can be processed by context block hardware.

For example, the generated hardware may process narrow transactions. The interface definitions may include the interfaces a generated context block hardware can support. Additionally or alternatively, the interface definitions may be the interface connected to context block hardware. According to one or more embodiments, the system parameters may include implementation details. According to one or more embodiments, the system parameters may include optimization parameters that may be iteratively changed to optimize a generated context block. The system parameters may be converted to an internal representation or other format, and the converted system parameters may be used for the remaining steps.

At step 406, context field definitions are received. The context field definition may include the components and algorithms to create a context block. The context field definition may be a pre-defined library, user defined, or any combination of the proceeding. Context field definitions may contain an algorithm that creates a description of hardware from high level system parameters. For example, context field definitions may contain an algorithm to create RTL (register transfer level) from system parameters. Context field definitions may contain an algorithm to create a number of context entries and context fields from system parameters. Context field definitions may contain an algorithm to create context fields and context entries from system parameters. Context field definitions may contain the implementation details to create a hardware description (e.g., RTL) for a context block, a context, context entries, and context fields.

At step 408, context generation module determines a number of context entries and context fields using context field definitions and system parameters. The algorithms contained within context field definitions may use the system parameters to determine a number of context entries and context fields. The algorithms contained within context field definitions may include optimization. The algorithm to create the number of context entries and context fields may at least partially be derived from other sources, e.g., other built-in libraries, user defined, etc. The algorithms may determine from the system parameters which context fields are needed in a context block.

At step 410, context block generation module creates a hardware description using the number of context entries, the context fields, and the context field definitions. The context field definitions may include the implementation details to create a hardware description of the number of context entries and the context fields.

At step 412, the hardware description is outputted. The hardware description may be outputted as any structure that can describe hardware, e.g., hardware function, Hardware Description Language (HDL), Verilog, VHDL, System Verilog, OpenAccess database, Library Exchange Format and Design Exchange Format (LEF/DEF), netlist, proprietary formats (e.g., vendor developed, customer developed, etc.), etc. The process is ended at step 414.

For example, when the system parameters specify that circuit area is to be minimized, then the system may create a context block that will not store the order of transactions and can create a barrier to block the transaction until the transaction can be processed.

In accordance with some embodiments and aspects of the invention, the system parameters may be used to create additional logic within a context block. The additional logic may include a meta operation of the context. For example, when it is determined that the context block is capable of sending 16 reads and/or 16 writes, then additional logic may be created that keeps track of the reads and/or writes, and controls the number of transactions entering the context block to stay within the 16 reads and/or 16 writes capacity. The additional logic may include error handling logic. For example, the error handling logic may determine an error has occurred and return a response that the error occurred. For another example, when the interface contains enough information to correct an error, the additional logic may correct the error.

In accordance with some embodiments and aspects of the invention, based upon the system parameters, a determination may be made that no context fields and context entries need to be created. In accordance with some embodiments and aspects of the invention, a determination may be made that a context block with the desired system parameters cannot be created. When the determination that a context block cannot be created with the given system performance, the system may inform the user, create a context box with performance as close as possible to the system parameters, or any other action that may be used in response to the determination. For example, when the system parameters define a bandwidth that is not capable of being implemented in hardware, the system may create a hardware implementation that is optimized for bandwidth in a given manufacturing process.

Figure 5:
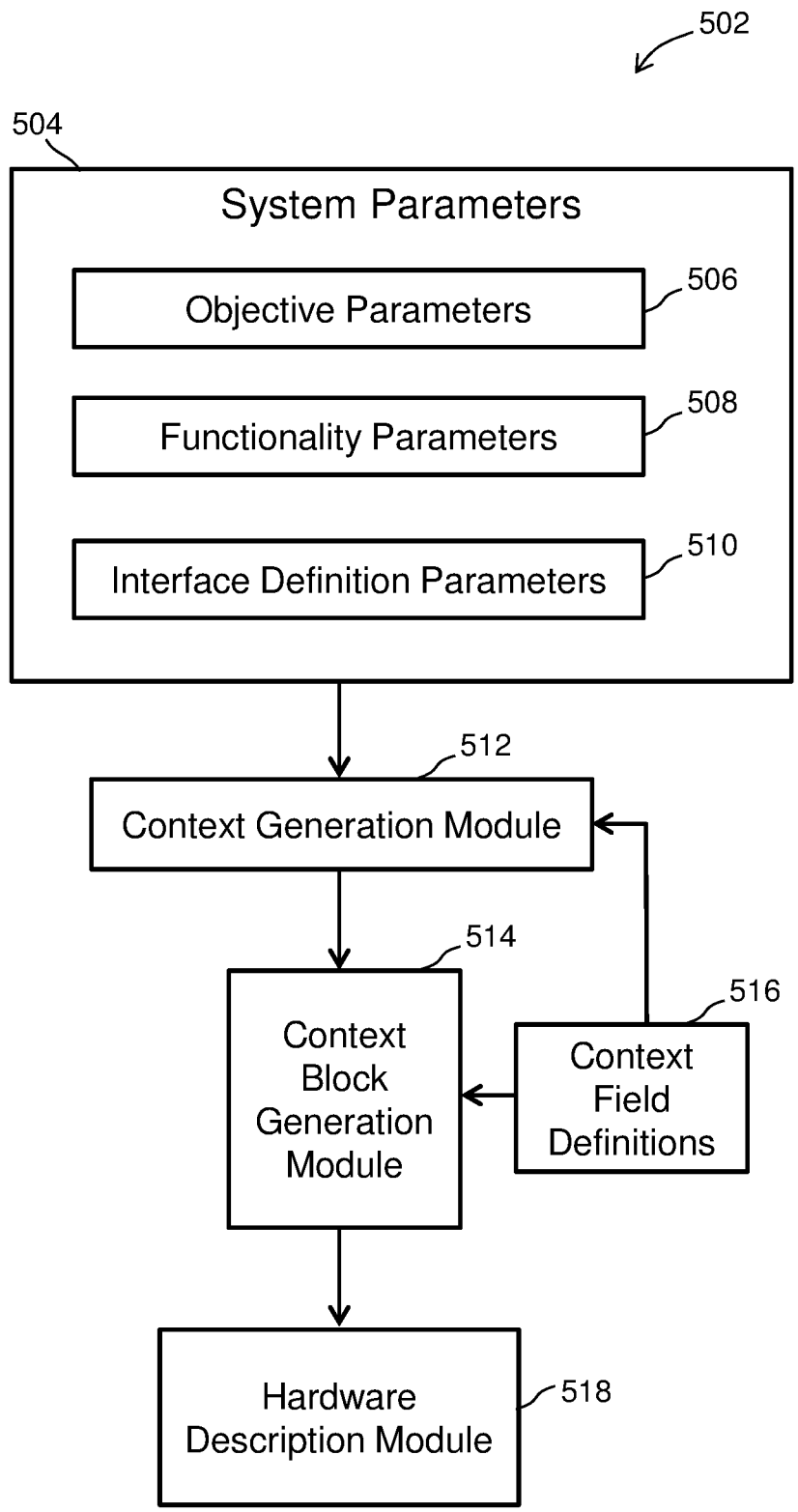
FIG. 5 shows a system for creating a context block using parameters, in accordance with the various aspects and embodiments of the invention.

Referring to FIG. 5 now, a system 502 is shown, according to one or more embodiments and aspects of the invention. System parameters 504 and context field definitions 516 are used by context generation module 512 and context block generation module 514 to create a hardware description. The hardware description is outputted by hardware description module 518. System parameters 504 include objective parameters 506, functionality parameters 508, and interface definition parameters 510. System parameters 504 may be the same or similar to system parameters received in step 404 of FIG. 4. Objective parameters 506 may include circuitry area, timing, power used by circuit, bandwidth, any other performance goal, and any combination of the proceeding. Functionality parameters 508 may include the type of transactions that can be processed by a generated context block. Interface definition parameters 510 may include interfaces that a generated context hardware can support. Context field definitions 516 may include the components and algorithms to create a context block. Context generation module 512 may determine a number of context entries and context fields from system parameters and context field definitions. Context block generation module 514 may use the number of context entries and context fields along with the context field definitions to create a hardware description. In hardware description module 518, the hardware can be outputted in any format that can describe hardware. The hardware description format may be the same or similar to step 412 of FIG. 4.

Figure 6:
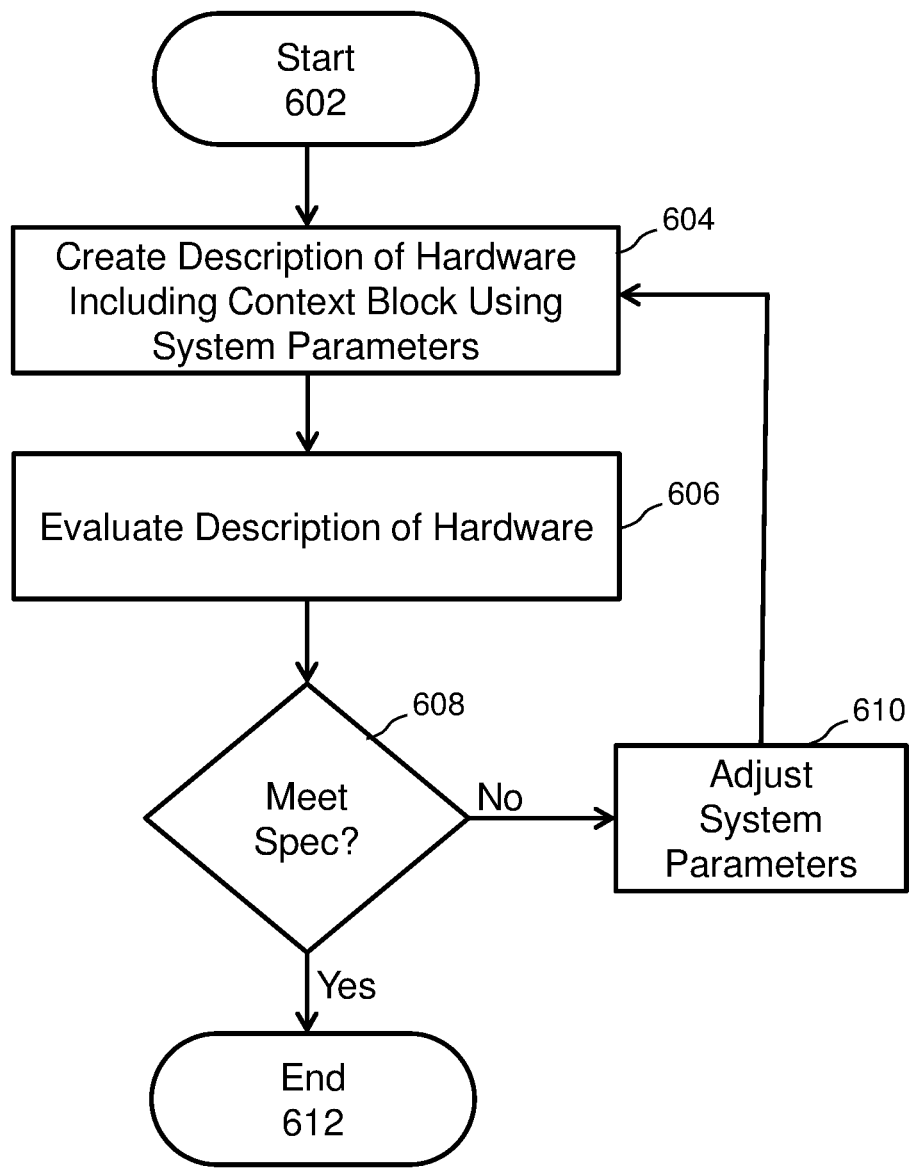
FIG. 6 shows context block generation optimization, in accordance with the various aspects and embodiments of the invention.

Referring to FIG. 6 now, a context generation optimization process is started with step 602. In accordance with some embodiments and aspects of the invention, a context generation optimization process described in FIG. 6 uses parameters to create a hardware description that includes a context module and iterates over the design in an optimization loop.

The context generation optimization process may be started by user input, by a scheduled time occurring, another task completing, a milestone event occurring in the electronic design, any other event capable of starting a context generation optimization process, and any combination of the aforementioned.

At step 604, a hardware description is created for a context block using system parameters. According to one or more embodiments and aspects of the invention, step 604 may perform the same or similar function as step 402 through step 414 of FIG. 4.

At step 606, the hardware description is evaluated to determine the evaluation metric. Any evaluation metric may be used to evaluate the hardware description. For example, the hardware description may be simulated to determine the evaluation metric. For example, the hardware description may be sent through a synthesis tool followed by place and route, and the state of timing closure may be the evaluation metric. The evaluation metric may be multi-dimensional. For example, the evaluation metric for a circuit may be the area needed for the circuit and the power that the circuit consumes.

At step 608, the specification is compared to the evaluation metric to determine if the requirements or constraints of the intended specification is met. If the intended specification is met, step 612 is performed, which completes the optimization process. If the intended specification is not met, step 610 is executed. For example, if after the hardware description is synthesized and placed and routed, the timing is not closed then the intended specification is not met and step 610 is performed.

At step 610, the system parameters are adjusted to optimize the design and/or meet the intended specification. Optimizing may mean an incremental improvement (e.g., local minimum), finding a global optimization (e.g., global minimum), and any other meaning known to a person of skill in the art. The parameters adjustment may involve changing system parameters, deleting system parameters and/or adding system parameters. including any combination thereof. For example, parameters to include retiming stages may be added to the system parameters. After step 610 is completed, step 604 is performed with the adjusted system parameters. Retiming stages may be added to the parameters. The process is ended at step 612.

For example, step 604 creates an initial set of context fields that are high performance. At step 606, a determination is made that the timing does not close. In step 610, a set of context fields with lower performance is chosen. When steps 604, 606, and 608 are repeated, timing closes and the process is ended at step 612.

Figure 7A:
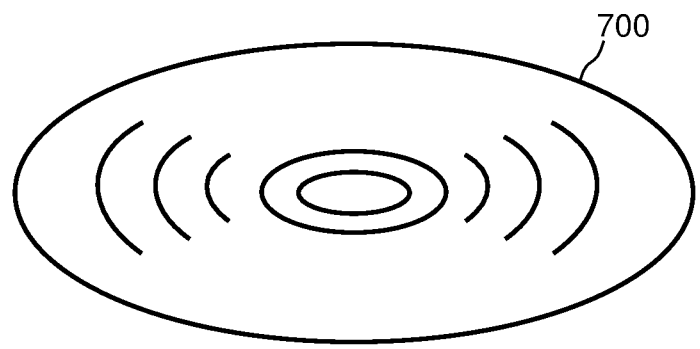
FIG. 7A shows a rotating disk non-transitory computer readable medium, according to an embodiment of the invention.

Referring now to FIG. 7A, shown is a non-transitory computer readable rotating disk medium 700 that stores computer code that, if executed by a computer processor, would cause the computer processor to perform methods or partial method steps described herein.

Figure 7B:
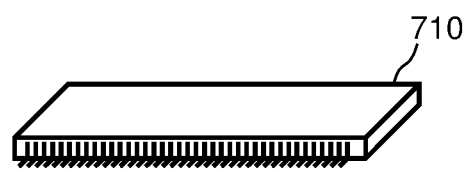
FIG. 7B shows a flash random access memory non-transitory computer readable media, according to an embodiment of the invention.

Referring now to FIG. 7B, shown is a non-transitory computer readable random access memory (RAM) chip medium 710 that stores computer code that, if executed by a computer processor, would cause the computer processor to perform methods or partial method steps described herein.

Figure 8A:
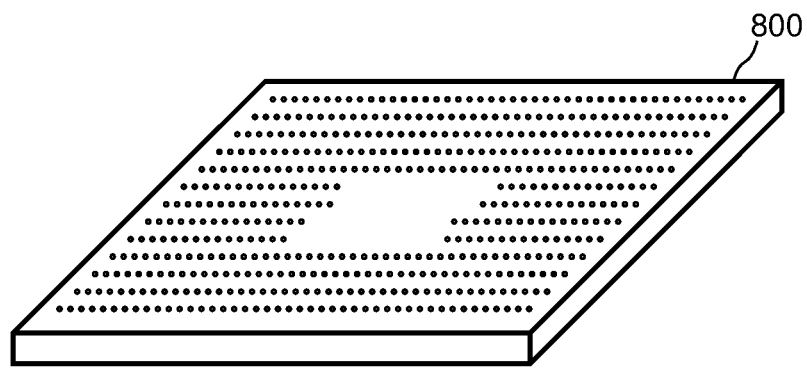
FIG. 8A shows the bottom side of a computer processor based system-on-chip, according to an embodiment of the invention.

Referring now to FIG. 8A, shown is the bottom (solder ball) side of a packaged system-on-chip (SoC) 800, which includes multiple computer processor cores having a component of some embodiments of the invention and that, by executing computer code, perform methods or partial method steps described herein.

Figure 8B:
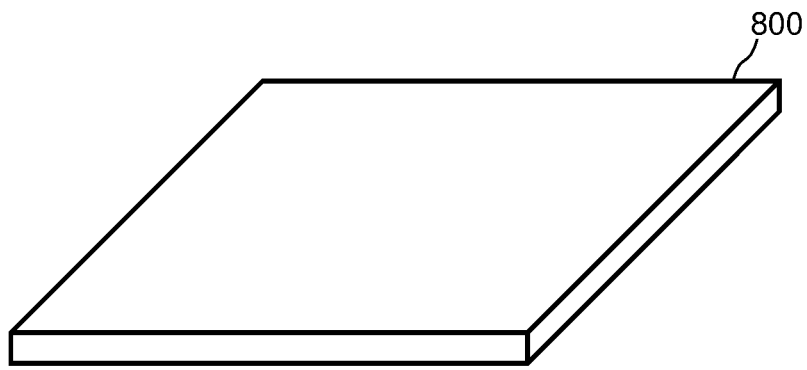
FIG. 8B shows the top side of a computer processor based system-on-chip, according to an embodiment of the invention.

Referring now to FIG. 8B, shown is the top side of the SoC 800.

The example of the one or more non-transitory computer readable media arranged to store such instructions for methods described herein. Whatever machine, which holds non-transitory computer readable media including any of the necessary code, may implement an example or an aspect of the invention. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Figure 9:
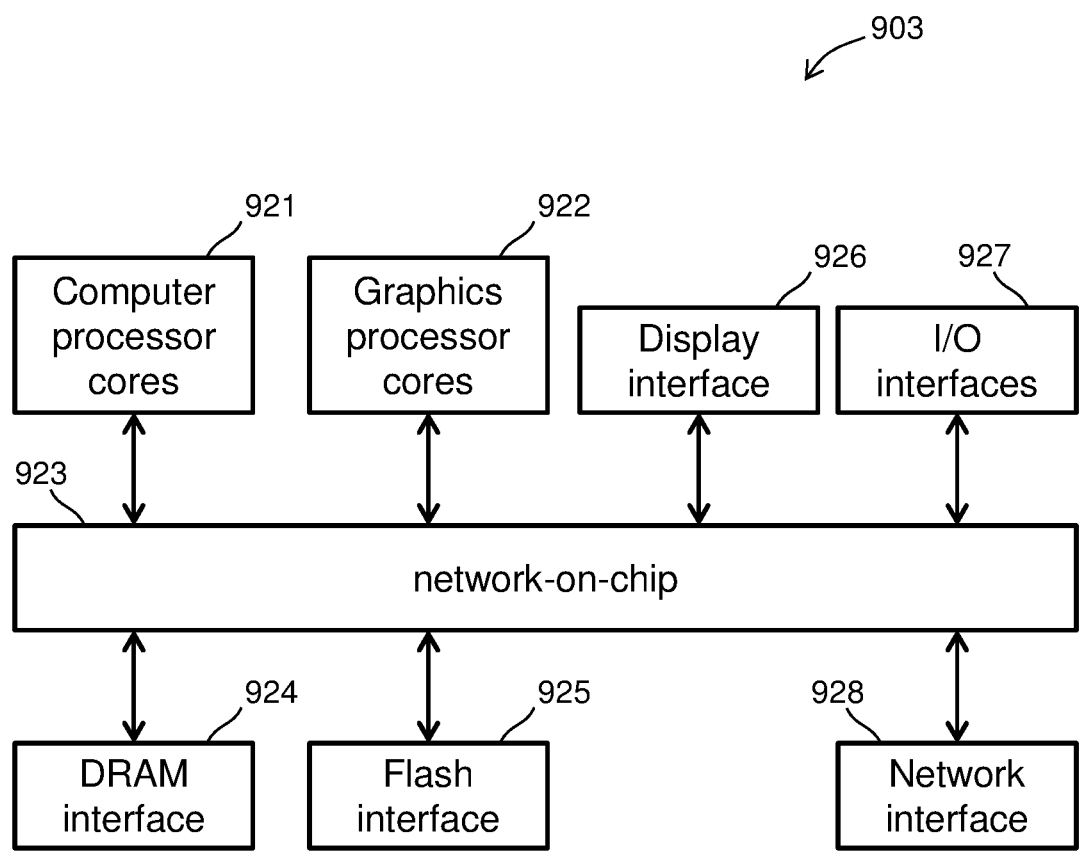
FIG. 9 shows a block diagram of a system-on-chip for devices, according to an embodiment of the invention.

Referring now to FIG. 9, a block diagram of the cores within the system-on-chip 903 is shown. The system 903 includes a multi-core computer processor (CPU) 921 and a multi-core graphics accelerator processor (GPU) 922. The CPU 921 and GPU 922 are connected through a NoC 923 to a DRAM interface unit 924 and a Flash RAM interface unit 925. A display interface unit 926 controls a display, enabling the system 903 to output MPEG video and JPEG still image message content. An I/O interface unit 927 provides for speaker and microphone access for the human-machine interface of a device controlled by SoC 903. A network interface unit 928 provides access for the system 903 to communicate with remote locations (such as servers) over the internet or a wireless network or a local area network.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for creating a context block, the method comprising:
   receiving parameters for a network, the parameter including:
      objective system parameters;
      functionality parameters; and
      interface definitions;
   receiving context field definitions; and
   creating the context block using at least the system parameters and the context field definitions.

2. The method of claim 1, further comprising outputting the context block as register transfer level (RTL).

3. A method for creating a context block, the method comprising:
   receiving system parameters including:
      objective parameters;
      functionality parameters; and
      interface definitions;
   receiving context field definitions;
   determining a plurality of context entries to generate using at least the system parameters and the context field definitions; and
   generating at least one context entry of the plurality of context entries.

4. The method of claim 3, further comprising determining context fields to create using the system parameters and context field definitions.

5. The method of claim 4, wherein determining the plurality of context entries includes optimization and determining the context fields includes optimization.

6. The method of claim 4, further comprising creating the context block using at least the plurality of context entries and a plurality of context fields.

7. The method of claim 6, wherein the context block is RTL.

8. The method of claim 6, wherein the context block includes logic for updating a response using the at least one context entry.

9. The method of claim 6, wherein the system parameters include retiming parameters to aid in timing closure of the context block and wherein creating the context block adds retiming components to the context block.

10. The method of claim 4, wherein system parameters include optimization parameters.

11. The method of claim 4, wherein system parameters include at least implementation details and determining a plurality of context entries uses at least partially the implementation details and wherein determining context fields uses at least partially the implementation details.

12. A system including a process and memory, wherein the memory stores code that is executed by the processor to cause the system to:
receive system parameters including:
objective parameters;
functionality parameters; and
interface definitions;
receive context field definitions;
determine a plurality of context entries to create using at least the system parameters and the context field definitions.

13. The system of claim 12 that is further caused to determine context fields to create using at least system parameters and context field definitions.

14. The system of claim 13 that is further caused to optimize based on the plurality of context fields.

15. The system of claim 13 that is further caused to create the context block using at least the plurality of context entries and the context fields.

16. The system of claim 15, wherein the context block includes logic.

17. The system of claim 15, wherein the system parameters include retiming parameters to aid in timing closure of the context block and creating the context block adds retiming components to the context block.

18. The system of claim 13, wherein system parameters include optimization parameters.

19. The system of claim 13 that is further caused to use implementation details to determine the plurality of context entries, wherein system parameters include the implementation details.

* * * * *